United States Patent
Patel et al.

(10) Patent No.: US 10,054,443 B1
(45) Date of Patent: Aug. 21, 2018

(54) JOURNEY ANALYSIS SYSTEM AND METHOD

(71) Applicant: National Technology & Engineering Solutions of Sandia, LLC, Albuquerque, NM (US)

(72) Inventors: Silpan M. Patel, Albuquerque, NM (US); David A. Wiegandt, Albuquerque, NM (US); Daniel Riley Fay, Albuquerque, NM (US); Richard McClanahan, Albuquerque, NM (US); Johnny C. Silva, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 121 days.

(21) Appl. No.: 14/933,305

(22) Filed: Nov. 5, 2015

(51) Int. Cl.
*G01C 21/12* (2006.01)
*G01C 21/00* (2006.01)
*G01C 21/20* (2006.01)

(52) U.S. Cl.
CPC ........... *G01C 21/005* (2013.01); *G01C 21/12* (2013.01); *G01C 21/20* (2013.01)

(58) Field of Classification Search
CPC ....... G01C 21/005; G01C 21/20; G01C 21/12
USPC ................................................ 701/411, 472
See application file for complete search history.

(56) References Cited

U.S. PATENT DOCUMENTS

| | | | |
|---|---|---|---|
| 6,584,403 B2 | 6/2003 | Bunn | |
| 7,299,125 B2 | 11/2007 | Marks et al. | |
| 9,002,635 B2 | 4/2015 | Trum | |
| 9,076,040 B1 | 7/2015 | Jing et al. | |
| 9,092,801 B2 | 7/2015 | Chang et al. | |
| 2004/0095383 A1 | 5/2004 | Pfiefer et al. | |
| 2004/0243303 A1* | 12/2004 | Padmanabhan | G01C 21/20 701/408 |
| 2011/0022532 A1 | 1/2011 | Kriss | |
| 2013/0210493 A1* | 8/2013 | Tal | H04W 52/0261 455/566 |
| 2014/0129175 A1* | 5/2014 | Poduri | G01C 21/005 702/141 |
| 2014/0214314 A1* | 7/2014 | Segev | G01S 19/34 701/410 |
| 2014/0278054 A1* | 9/2014 | Tidd | G01C 21/00 701/409 |

(Continued)

*Primary Examiner* — Nadeem Odeh
(74) *Attorney, Agent, or Firm* — Medley, Behrens & Lewis, LLC

(57) ABSTRACT

The various technologies presented herein relate to determining a location of an individual, or an object, when a GPS may be unavailable/occluded. Readings from a plurality of sensors on a mobile device can be generating a plurality of data (e.g., speed, motion, temperature, biometric, etc.) which can be combined to generate a probability of a user of the mobile device being at a particular location, or not. Sensor readings can be weighted to enable sensors having a large effect on a degree of confidence of the probability of the user being determined to be at a location being given priority (e.g., battery priority) versus those sensors which have lesser effect on the degree of confidence. With the user determined to be at a location, information, a notification, an instruction, etc., can be presented to the user, via the mobile device.

10 Claims, 10 Drawing Sheets

(56) References Cited

U.S. PATENT DOCUMENTS

| | | | |
|---|---|---|---|
| 2015/0160015 A1* | 6/2015 | DeWeese | H04W 4/043 |
| | | | 701/526 |
| 2015/0168153 A1* | 6/2015 | Hsu | G01C 21/20 |
| | | | 701/469 |
| 2015/0177013 A1* | 6/2015 | Siliski | G01C 21/3423 |
| | | | 701/433 |
| 2015/0253146 A1* | 9/2015 | Annapureddy | G01C 21/36 |
| | | | 701/490 |
| 2016/0169692 A1* | 6/2016 | Gupta | B60W 10/08 |
| | | | 701/521 |

* cited by examiner

JOURNEY ANALYSIS SYSTEM AND METHOD

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

The Global Positioning System (GPS) is a space-based navigation system configured to provide location and time information in all weather conditions, anywhere on or near the Earth. GPS (or other geolocation mechanism) has become a fundamental tool in the provision of situational awareness. However, a scenario can occur where OPS becomes inoperable, e.g., when line of sight from a device having a GPS is occluded to the plurality of satellites utilized in provisioning a GPS.

SUMMARY

The following is a brief summary of subject matter that is described in greater detail herein. This summary is not intended to be limiting as to the scope of the claims.

Various exemplary embodiments presented herein relate to determining a location, an activity, etc., of an individual, or an object, when a GPS may be unavailable/occluded. In an embodiment, during navigation of a journey, an individual (a user, a person) carries a mobile device with them, wherein the mobile device includes a plurality of sensors. The mobile device is in communication with a remotely located computer system. The remotely located computer system can be configured to generate a route for the journey which the user is to follow. Further, the computer system can analyze data pertaining to the user to identify one or more characteristics of the user (e.g., stride length, strides per minute for different terrain, electrodermal information, biometric signature, etc.). The computer system can also be configured to identify, generate, and/or obtain information regarding the route, or segments thereof, e.g., distance between waypoints along the route, mode(s) of transport available for each journey segment, anticipated weather conditions at a waypoint or destination, terrain along a route segment (e.g., altitude, road, pavement, grass, etc.) etc. In an embodiment, the route information can be obtained from an internet-based source(s), a database(s), a third party, etc. The computer system can further generate various criteria pertaining to the journey (or segment thereof), wherein the criteria can be configured to take into account a characteristic(s) of the user, the route information pertaining to a journey segment, or a combination thereof.

As the user is navigating the journey, or a segment thereof, the plurality of sensors located on the mobile device can generate a plurality of data (e.g., environment (temperature, pressure, humidity, GPS, etc.), activity (e.g., walking, running, jogging, driving, flying, etc.), biometric (speaker identification, gait analysis, etc.), and further, the sensor data can be transmitted to the remotely located computing system (e.g., data transmission can be in real-time, batch-mode, etc.). At the computing system, the sensor data can be processed and compared with the criteria of the journey segment. In an embodiment, a determination (e.g., a measure of compliance) can be made with regard to whether the user is complying with the criteria, e.g., is the user adhering to the route?

In an embodiment, the measure of compliance can also include a probability of the correctness of the measure of compliance, e.g., how likely is the measure of compliance to be correct?, incorrect?, etc. For example, during generation of a journey, the computing system determines that it will take approximately x minutes (e.g., expected time) for a person to fly between point A and point B, where the person travels by a route r. However, it is determined that it took the user a time of y minutes (e.g., actual time) to fly between point A and point B. Hence, while the user did not reach point B in approximately x minutes, given the uncertainty of the actual travel time versus the expected travel time, is the user at point B? Available sensor data can be reviewed to determine whether the difference in travel times was due to the user having to take a diversion, the user is not at point B, etc. For example, does an inertia measurement(s) (e.g., acceleration, deceleration) from the mobile device indicate that the user travelled by air or car? And, was car travel an expected alternate mode of transport from point A to point B? Can the inertia measurement(s) be supplemented with altitude data to further enforce a determination that the user took a flight? If it is determined that the user took a flight, does the motion data indicate that there was a period of turbulence during the flight and hence the flight took longer than expected? In another example, from motion sensing data received from the mobile device match a stride pattern and pace for the user when walking on a pavement, or does the motion data indicate the user was cycling? Do readings from a compass located on the mobile device indicate that the user travelled in directions expected, e.g., in accord with directions of the route? Is a temperature reading from the mobile device consistent with weather conditions being experienced at point B?

Hence, even though GPS signaling might not be available, it is possible to combine sensor data received from a plurality of sensors at the mobile device to provide an indication of a location of the user, a route travelled, etc. Thus, while data from a first sensor may indicate that the user is not in compliance with a criteria (e.g., a route between points C and D), e.g., there is a period of spurious readings from the first sensor that cannot be explained, with an acceptable degree (e.g., high degree) of certainty as to their cause, by analyzing the first sensor data in isolation. However, data from a second sensor may provide explanation for the spurious readings in the first sensor and the initially low confidence prediction generated from the first data can become a high confidence prediction when the spurious measurements in the first data are explained by the second data. Accordingly, data from a plurality of sensors can be combined to generate a probability of a particular event, e.g., probability of a user of the mobile device being at a particular location, or not.

In an embodiment, sensor readings can be weighted to enable data received from a particular sensor that is deemed to have a strong influence on a confidence of a determination (e.g., determination of a user being at location F, or not) to have priority over less influencing sensors. In an embodiment, if battery power at the mobile device becomes a concern, the sensors having a high weighting can remain powered while other sensors are turned off, thereby maximizing the battery life and data collection at the mobile device.

In an embodiment, any of information, a notification, an instruction, a request, etc., can be presented to the user, e.g., via a display on the mobile device, a speaker on the mobile device, etc. An instruction can include a request for the user to capture a digital image of their current location to, for example, enable confirmation of the user's location, enable redirection of the user to a route segment of the journey, etc. In a further embodiment, upon the user being determined to be at a location, or is arriving at a location, an action can be performed (e.g., autonomously) by the computer system and/or the mobile device, e.g., the user is determined to be arriving at an airport and a ticket for a flight is automatically procured in accordance with their arriving at the airport, an order can be placed for a meal as a person is nearing a restaurant, etc.

In an embodiment, a journey profile can be create utilizing a priori knowledge of environment, activity, and biometric features associated with the expected journey of the mobile device. The mobile device is deployed at the start of the journey, whereupon sensors onboard the mobile device are utilized to collect data and compute any of environment, activity, and biometric features. The measured features can be compared with the expected journey profile using machine learning classifier techniques. A confidence metric can be output indicating the overall likelihood of adherence (or deviation) to the expected journey.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
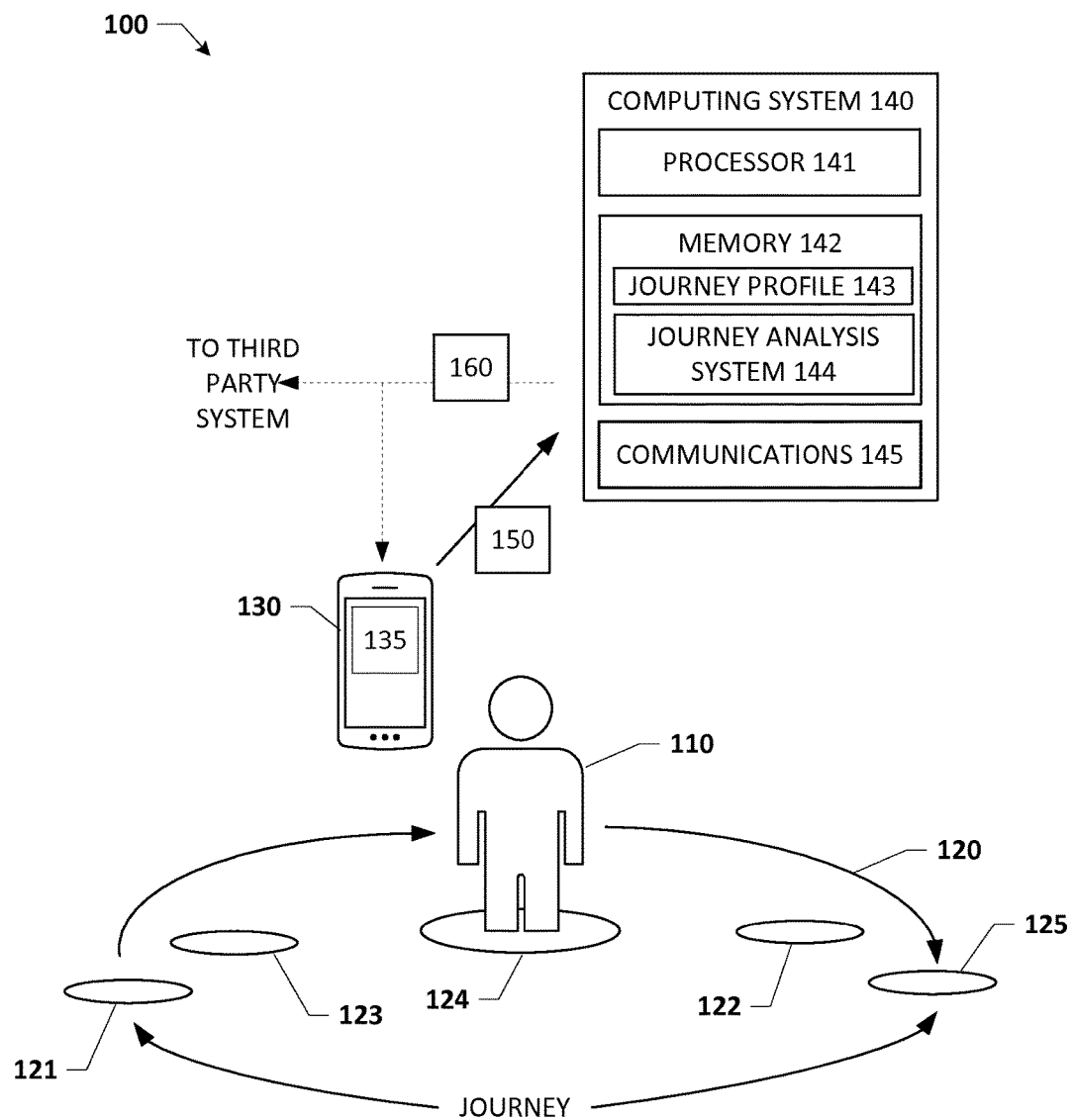
FIG. 1 is a block diagram illustrating an exemplary embodiment of a user undergoing a journey.

Various technologies pertaining to determining a location of an individual, or an object, when a Global Positioning Technology (GPS) system may be unavailable or occluded are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

The various embodiments relate to determining a location, activity, status, etc., of a person. GPS has been developed to enable determination of where a person is (e.g., via a GPS component included in a device being carried by the person). However, a situation can occur where GPS is not available, e.g., GPS signaling is attenuated or occluded by a building, by foliage (e.g., a triple canopy comprising tall trees, medium trees, and small trees), etc. Hence, a situation can arise where GPS cannot be relied upon to provide location information for an individual's location, and other methods and sensors are to be utilized when the GPS is unavailable. Utilizing a positioning method that does not rely in GPS positioning is referred to herein as a GPS independent method. Further, one or more GPS independent methods presented herein can be utilized to supplement determination of a person's location, activity, etc., when GPS is available. Further, where GPS is available, a GPS measurement only provides information regarding a location of an individual. However, to develop an ability for a computer system (e.g., a mobile computing device or other computing system) to autonomously make a more complex decision, further information is required, e.g., based upon an environment, an activity, and/or a biometric feature of the person.

The various embodiments presented herein are directed towards building an intelligence picture of a location, action, etc., of an individual with regard to a journey, e.g., at a particular moment in time, wherein the moment n time can be at any point the individual is embarked on the journey. In an embodiment, a journey can comprise of a plurality of consecutive segments, e.g., segments A, D, C, D, and E, and while an individual can be tracked throughout the segments, upon arriving at a waypoint in segment C, the individual can receive a notification, instruction, request, etc. Further, the various embodiments presented herein enable a system monitoring progress of an individual throughout a journey to act autonomously, e.g., at the waypoint, completion of journey, etc.

FIG. 1 presents a schematic illustrating system 100 comprising an individual (a user) 110 undergoing a journey 120, wherein the journey 120 comprises a route connecting a plurality of waypoints (121-123), a start point 124 and a destination 125. During the journey 120, the user 110 is carrying a mobile device 130. The mobile device 130 can be any device that is carried by the user 110, such as a portable computing device, a mobile phone, a cellphone, a smartphone, a personal digital assistant (PDA), a personal computer, a computer tablet, a laptop computer, etc.

The mobile device 130 comprises a plurality of sensors and other components which can provide information regarding the user 110 and/or their progress on the journey 120, e.g., has the user 110 reached a particular waypoint on the journey 120?, has the user 110 reached the destination 125?, is the user 110 following the route?, has the user 110 veered off of the route?, is the user 110 visiting the waypoints 121-123 in a prescribed sequence?, is the user 110 visiting the waypoints 121-123 but in an order that does not match the prescribed sequence?, etc.

In conjunction with the mobile device 130 being a stand-alone system, in another embodiment, the mobile device 130 can be incorporated into another system. For example, the mobile device 130 can be incorporated into a vehicle being utilized by the user 110. The mobile device 130 can be in communication (e.g., via hardwire connection, Bluetooth, Wi-Fi, etc.) with an onboard computer (not shown) which is monitoring and/or processing data provided by a plurality of sensors and other devices operating on the vehicle, where such sensors can include a compass, a speedometer, etc.

The mobile device 130 can include a plurality of components 135 comprising any of a sensor(s) (e.g., temperature, pressure, time, altitude, speed, inertia, motion, light, humidity, a compass, a gyroscope, an accelerometer, magnetometer, barometer, proximity sensor, a camera, a microphone, a custom built sensor, biometric, etc.), a communication(s) system (e.g., Bluetooth, cellphone technology, Wi-Fi, etc.), an operational component(s) (e.g., a battery sensor for a battery powering the mobile device 130), etc., as further described herein. In an embodiment, the mobile device 130 can further include a navigation system (e.g., GPS), however, for one or more portions of the journey 120 the navigation system may not be available and other information from the mobile device 130 is utilized for which a determination of a status regarding the journey 120 can be made, inferred, etc.

The mobile device 130 can be communicatively coupled to a remotely located computer system 140, wherein the computer system 140 is monitoring at least one signal 150 being transmitted from the mobile device 130. The at least one signal 150 transmitted between the mobile device 130 and the computer system 140 can include one or more items of data, wherein the data relates to measurements and other information generated by any of the components 135 (e.g., sensors) located at the mobile device 130.

The computer system 140 comprises a processor 141 and a memory 142, wherein the memory 142 comprises data that is accessible to the processor 141 and instructions that can be executed by the processor 141. With more particularity, the memory 142 comprises a journey profile component 143 that is configured to perform one or more functions. As further described herein, the journey profile component 143 can be configured to generate a journey 120, and segments thereof. Once the journey has been defined, the journey profile component 143 can further apply one or more characteristics (signature(s)) of the user 110 to the journey segments, and also apply known travel information to the journey segments (e.g., weather conditions, mode of transport, travel times, etc.). Based upon the user characteristic(s) and the travel information the journey profile component 143 can generate one or more criteria (parameter(s)) which can be utilized to determine whether the user is adhering the journey, location on the journey, user activity, etc. In an embodiment, the parameter can be monitored throughout a journey 120, a segment of a journey, to enable an observed distribution of the parameter to be obtained.

The memory 142 further comprises a journey analysis system 144 configured to utilize data 150 received from the mobile device 130 and in conjunction with information stored and/or known about the journey 120 (e.g., the criteria and/or parameters defined by the journey profile component 143), determine whether the user 110 is complying with the journey (e.g., is following the waypoints 121-123) or not. Based upon different exemplary scenarios the journey analysis system 144 can perform a plurality of functions. For example, the journey analysis system 144 can determine that the user 110 has arrived at a particular waypoint, and based upon such determination, the journey analysis system 144 can generate an output 160, e.g., a text message, that is to be transmitted to the user 110. In an embodiment, the journey analysis system 144 can be configured to perform any desired automated action as part of generating the output 160, for example, upon a determination that the user 110 is at a destination, a time sensitive action can be performed, for example the user 110 has arrived at a stadium and a ticket for the event is purchased (e.g., via a third party automated online purchasing system) based upon the output 160. In another example, the output 160 can be forwarded to a third party automated meal purchasing system (or other service), wherein the output 160 comprises a particular meal order (or other purchasable item). In a further example, the journey analysis system 144 can determine that the user 110 has arrived at an airport (e.g., waypoint 123), whereupon the output 160 can be forwarded to an automated airline ticket purchasing system, that can review a number of available flights for transporting the user 110 to a destination airport (e.g., destination 125). The output 160 can include information regarding travel preferences of the user 110, e.g., window seat, aisle seat, meal requirements, etc. Per the previous example, the user 110 can simply focus their attention on getting to the airport (e.g., waypoint 123) and the journey analysis system 144 (in conjunction with an online ticket purchasing system) can be working in parallel to ensure that the user 110 is provided with a flight to the destination that is the most convenient, shortest travel time, meets a desired number of connecting flights (e.g., direct, one connecting flight only, etc.), etc., based upon the time the user 110 arrives at the airport.

The computing system 140 further includes a communication system 145 (e.g., a transceiver) that can be utilized to communicate with the mobile device 130. Communication between the communication system 145 and the mobile device 130 can be via any suitable technology, cellular, Wi-Fi, Bluetooth, etc.

Continuing the previous example, the journey analysis system 144 can forward the output 160 to the communication system 145, whereupon the communication system 145 can transmit the output 160 to the mobile device 130, for presentment of the output 160 to the user 110. In another exemplary scenario, a third party can be monitoring the user 110 with regard to their progress (or not) on the journey 120, and an output 160 can be transmitted to a third party indicating a status of the user 110 with regard to the journey 120, e.g., the output 160 is a notification that the user 110 has reached a particular point in the journey 120 (e.g., the user 110 is at waypoint 122).

In an embodiment, as further described herein, the journey analysis system 144 can be configured to make one or more probabilistic determinations that the user 110 is performing an action, is at a location, has a status, etc., with regard to the journey 120. For example, a flight typically takes 3 hours, and monitoring of data received from the plurality of sensors 135 on the mobile device 130, it is known that the flight took 4 hours and 10 minutes to be completed. Data received from the plurality of sensors enables determinations such as was the flight departure delayed?, was the flight diverted owing to weather?, did the flight have to take an extended route to avoid a weather system?, etc. Data from a single sensor, when analyzed in isolation, may not be able to answer any of these exemplary questions with a high degree of certainty in the correctness of the answer, however, analyzing a combination of data recorded from a plurality of sensors might enable one of the questions to be answered, and with a high degree of certainty.

In an embodiment, a location of the mobile device 130 can be approximated based upon multilateration of the mobile device 130, where the mobile device 130 includes a communication system. For example, the mobile device 130 is a mobile phone and location of the mobile device 130 can be ascertained from multilateration of signaling between the mobile device 130 and a plurality of radio towers providing telephone coverage to the mobile device 130. However, a situation can arise where the mobile device 130 is being operated in an area with minimal and/or zero telephone signaling. Hence, multilateration can provide location determination when a GPS is inoperable, however, the multilateration operation requires telephone signaling architecture to be available to the mobile device 130, which may not always be available, wherein the various embodiments presented herein may enable location determination when multilateration is temporarily available or unavailable.

Figure 2:
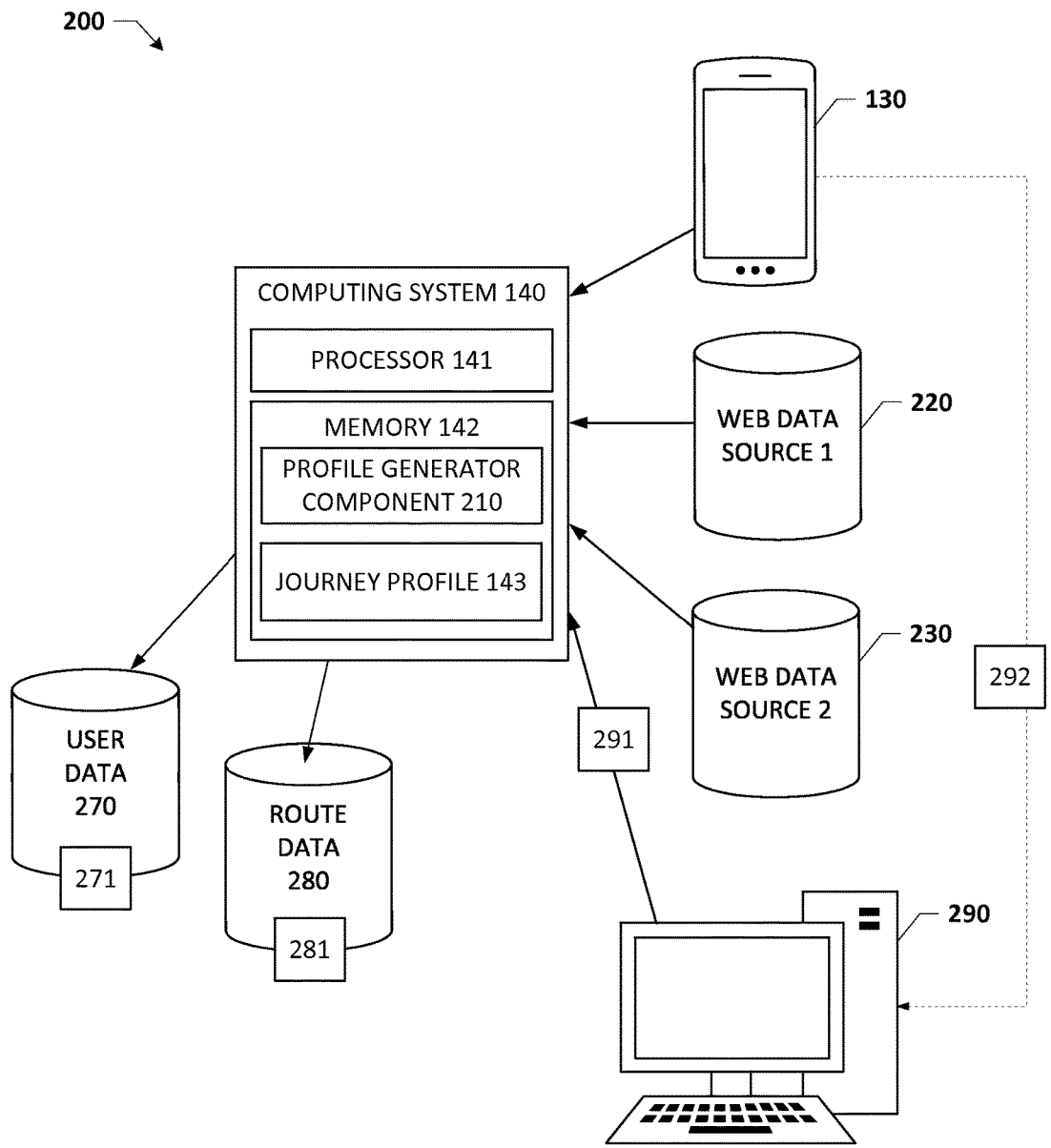
FIG. 2 is a block diagram illustrating an exemplary embodiment of data collection.

FIG. 2 illustrates a system 200 which can be utilized to generate a journey profile. As shown, the computing system 140 includes a profile generator component 210, wherein the profile generator component 210 can be utilized to generate one or more journeys configured in the journey profile component 143 (e.g., the profile generator component 210 can operate in conjunction with the journey profile component 143).

A plurality of information and data sources can be communicatively coupled to the computing system 140. As previously mentioned, a mobile device 130 can be carried by a user 110, wherein the mobile device 130 can include a plurality of sensors that can provide information about the user 110 with regard to their progress on the journey 120. Further, the mobile device 130 can include one or more biometric sensors, etc. In an embodiment, a biometric sensor can be utilized to generate information about how the user 110 walks, jogs, runs, etc. For example, over a period of time, a biometric sensor can be monitoring the person's gait, and thus a profile for how the person walks can be generated, e.g., training data comprising their stride pattern over different terrains, typical strides per minute when the person is walking, strides per minute when the person is running, walking stride length, running stride length, etc. For example, the user 110 will likely have a faster rate of walking, and with a longer stride, when walking on pavement, as opposed to walking on a grass field, and further, as opposed to walking up a grassy incline. In another embodiment, the biometric sensor can be an identification device such as a fingerprint sensor, a retina sensor, a heart rate sensor, breath-o-meter, etc., utilized to enable determination of an identity of the user 110. In another embodiment, where the mobile device 130 is a phone, voice data (e.g., speech) for the user 110 can be collected from conversation recorded at a microphone (e.g., during a telephone conversation), and subsequently, a voice profile (e.g., accent, pronunciation, dialect, word usage, rate of speech, etc.) can be generated for the user 110. At a later time, the voice profile can be utilized to identify the user 110. In another embodiment, the mobile device 130 can include a temperature sensor, an electrodermal sensor, or other sensor that can be used to monitor a person's temperature, an electrical characteristic of the person's skin as a function of their body temperature, sweat secretion, etc. System 200 includes a user data store 270, wherein the user data store 270 is configured to store various data 271 (characteristic) about the user 110 generated by one or more sensors and other monitoring components located on the mobile device 130, and/or previously known about the user 110 (e.g., in the form of previously acquired training data).

In conjunction with data generated from one of more sensors located on the mobile device 130, information regarding a journey can also be obtained. A plurality of web data sources, e.g., web data sources 220 and 230, can be utilized to provide such information. For example, web data source 220 can be an internet page for weather which can be accessed to obtain weather information for one or more stages of a journey, e.g., for any of the waypoints 121-123, the departure point 124, the destination 125, etc. Hence, the first web data source 220 may provide temperature history for one or more locations. In another example, the second data source 230 may be an internet resource relating to airline flights and associated data, e.g., available flights, flight duration, flight altitude data, etc., for a plurality of flights, and particularly flight characteristics that pertain to any segment of the journey 120 (e.g., flight information for one or more flights connecting a pair of waypoints, a departure point to a waypoint, a waypoint to a destination, the departure point to the destination, etc.). In a further example, the first web data source 220 may be an online mapping service that can provide a map(s) based upon a location (or request) of the user 110. Accordingly, when user 110 is navigating the journey, in an example, a direction sensor (e.g., a compass) located on the mobile device 130 can provide a heading of the user 110 (e.g., direction of travel) which can be compared with a desired direction of travel to determine adherence of the user 110 to the journey 120, e.g., the user 110 drives 2 miles in an easterly direction, drives 0.6 miles in a north east direction, and drives 3.2 miles in a northerly direction, wherein the distance data can be provided by an odometer (mileometer) located on the car and is communicatively coupled to the mobile device 130. Hence, by knowing the direction(s) travelled and respective distances travelled, a determination can be made regarding whether a user 110 is complying with a prescribed journey 120, or not. And if not, why not? For example, the second data source 230 can be a database comprising current traffic conditions, road works, diversions, etc. With the traffic data available, it is possible to identify the user 110 is leaving the predefined route of the journey 120 (or portion thereof) as a result of following a diversion, and at a subsequent location (e.g., at the end of the diversion) the user 110 returns to the predefine route to continue on the journey 120. System 200 includes a route data store 280, wherein the route data store 280 can be utilized to store data and information 281 regarding the journey 120.

System 200 further includes a computer system 290, wherein the computer system 290 can be a personal computer, a laptop computer, a smart phone, a server, etc., which enables a third party (not shown) to interact with the computing system 140, and also the mobile device 130. The computer system 290 can be communicatively coupled to the computing system 140 by any suitable technology, e.g., intranet, internet, networked, etc.

For example, while the user 110 is undertaking the journey 120, the third party can request further information from the user 110 with regard to the journey 120, a current location on the journey 120 (e.g., information about a waypoint that the user may be at, information about a location between any of an initial location, a waypoint, a destination, etc.). For example, the third party can input a request 291 for the user 110 to take a photograph 292 (e.g., with a camera located on the mobile device 130) from their current location and send the photograph 292 to the third party. Upon receipt of a photograph 292 taken in response to the request 291, the third party can review the photograph 292 to determine whether a scene (e.g., a man made structure(s), a natural feature(s), or combination thereof) is known to the third party, and based thereon, the third party can provide location information to the user 110 (where the information is available). In an embodiment, an image analysis system, or other suitable technology, can be utilized by the third party to review the photograph 292, and determine location information based thereon. While item 291 is previously described as being a request, item 291 can also be a notification, an instruction, etc., generated by the third party, via the computer system 290. Further, while item 292 is previously described as being a photograph, item 292 can be any type of file, data, etc. For example, the item 292 can be a video file, a voice file, a sound file, a biometric file, etc.

In another embodiment, the computer system 290 can be utilized to generate the journey 120. For example, a third party can utilize one or more applications at the computer system 290 to generate the journey 120, and segments 121-124. Upon generation of the journey 120, the journey 120 can be submitted to the journey profile component 143 for further processing by the journey profile component 143, e.g., defining one or more criteria or parameters for the journey 120 based upon the user data 271 and/or the travel information 281.

Hence, the profile generator component 210 and the journey profile component 143 can operate in combination, wherein a journey 120 can be defined based upon user data 271 and journey information 281. Hence, while the journey information 281 indicates a segment of the journey 120 is a paved trail, the knowledge of the trail being paved can be supplemented with knowing how long it will take for the user 110 to navigate the trail with their stride length and pace. The combination of user data 271 and journey information 281 enables one or more criteria or parameters to be established (e.g., by the profile generator component 210) particular to the user 110. If a different, second user undertakes the journey, a set of criteria or parameters particular to the second user can be generated (e.g., by the profile generator component 210).

Figure 3:
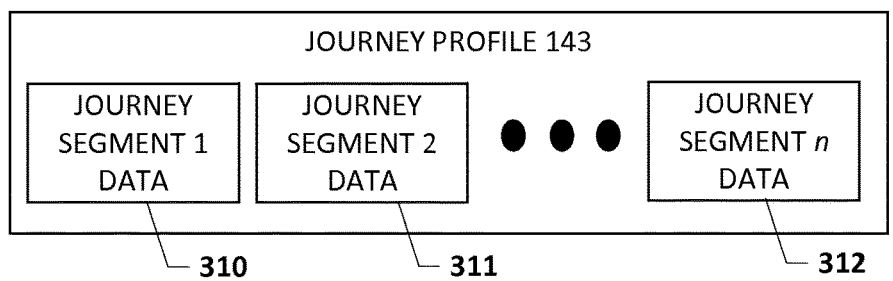
FIG. 3 is a block diagram illustrating an exemplary embodiment of a journey comprising a plurality of discrete segments.

FIG. 3 presents a block diagram 300 of a journey profile 143, relating to journey 120, being separated into a plurality of segments. As shown, the journey profile 143 can be separated into a plurality of n segments (e.g., which include any of the initial point 124, the destination point 125, waypoints 121-123, etc.), where n is a positive integer. Each journey segment in the n journey segments can have journey segment data 310-312 associated therewith. For example, weather data 281 can be retrieved, e.g., from the route data store 280, for one or more locations associated with a particular journey segment. Hence to determine that the user 110 is at a particular location, a temperature value received from the mobile device 130 can be compared with the weather data 281 for the location at which the user 110 is deemed to be at. For example, if the user 110 is in San Diego, Calif. in January, then a higher temperature value would be expected to be sent from the mobile device 130 than if the user 110 was located in Cleveland, Ohio in January (e.g., it is probable that the temperature in San Diego will be 65° F., while in Cleveland it is probable that it is 10° F.). Hence, a situational awareness prediction can be made based upon a temperature received from the mobile device 130.

A journey profile 143 can include journey segment data 310-312 for several discrete segments of the journey 120. For instance, a journey 120 comprises a route travelled by user 110 to their office. In a first segment 310, the user 110 walks to their car, in a second segment 311 the user drives their car to the office car park, and a third segment 312 involves the user 110 walking from their car to their office. A plurality of sensors on the mobile device 130 can be utilized during the journey to determine whether the user 110 is undertaking the journey 120. For example, during the first segment 310, a determination can be made that the user 110 is moving at a speed compliant with a human walking, jogging, running, etc., as opposed to a speed expected if the person was travelling in a car at high speed. At the end of the first segment 310, the user 110 opens the car door, gets into the car, closes the car door, and positions themselves for driving, wherein each body motion of the user 110 when getting into the car can be captured by a motion sensor. During the drive from the user 110's house to their office, an inertia sensor (e.g., an accelerometer) can be detecting the motion of the car. In another embodiment, a temperature sensor can be monitoring the temperature conditions within the car. In a further embodiment, a microphone can be monitoring whether the radio is being listened to, and can record the radio transmission to enable subsequent extraction of data from the radio transmission (e.g., radio station name, radio station frequency, location of the radio station, songs being played, studio conversation being transmitted, a time transmitted, etc.). The microphone can further record external sounds from which progress of the car can be determined, a horn blaring as the car is in slow moving traffic, a wind noise as the car is travelling at speed. Also, a determination can be made as to the vehicle the user 110 is using, e.g., is the user 110 riding a motorbike as opposed to travelling in a car?, where such a determination can be based upon motion sensing the movement of the user 110 as they ride the bike (e.g., leaning to negotiate a curve(s)), wind noise, engine noise, exhaust noise, etc. At completion of the second segment 311, the user 110 parks the car, exits, and walks to the office. Again, various sensors can be utilized to monitor motion of the user 110, temperature of their surroundings, etc. For each of the segments 310-312 a clock can be utilized on the mobile device 130 to provide a timing to complete each respective segment.

As previously mentioned, each journey segment can include data and information that pertains to that journey segment, such as time—typically, how long does the segment take to complete? is the journey segment travelled, or to be travelled, at a particular time of day? Data can also include location information, such as what is the starting point of the journey segment?, what is the end point of the journey segment?, what is the typical route for the journey segment?, is another route(s) available for the segment?, etc.

Figure 4:
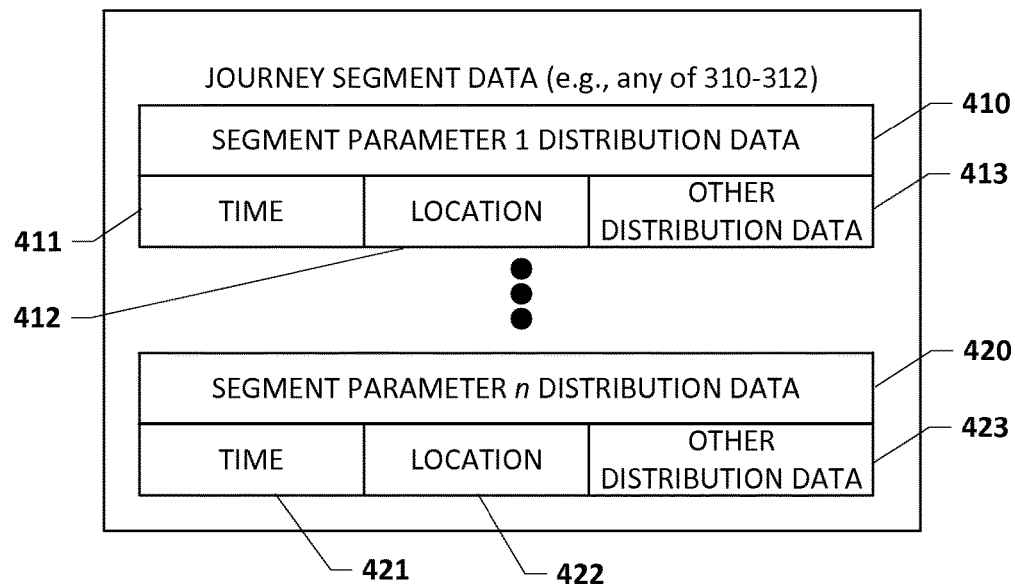
FIG. 4 is a block diagram illustrating an exemplary embodiment of a data which can be compiled for a segment(s) of the journey.

FIG. 4 illustrates journey segment data 400 (e.g., any of journey segment data 310-312), which can be broken down into one or more probability distributions. For example, one or more parameters can be monitored for a segment, wherein, rather than a simple binary decision of "has a condition of the parameter been met? Yes or No?", a probability distribution can be applied to the parameter to enable a determination of whether an action, response, measurement, etc., performed by or relating to the user 110 may, or may not, be in compliance. For example, upon assessing a first parameter, the level of confidence of satisfying a requirement of the parameter (e.g., a parameter criteria) has a value of 75% probability, rendering the parameter criteria to have an "uncertain" status with regard to being met. Hence, to resolve the confidence, a second parameter is assessed in terms of whether a criteria of the second parameter has been met, whereupon the second parameter has a value of "98%", rendering the second parameter criteria to have a "certain" status. The statuses of the first parameter and the second parameter can be combined, from which a further determination can be made with regard to a status of the user 110, e.g., "Yes, based upon the combination of the first parameter and the second parameter, the location of the user is confirmed as being at location P".

As shown in FIG. 4, segment parameter 1 distribution data 410 (or 420) can be a probability distribution across possible values of a "segment parameter". For example, over the course of a week a pedometer is worn by the user 110, with data from an inertial sensor in the pedometer being collected over the course of the week. From the pedometer data, a probability distribution for data output by the inertial sensor can be computed when the user 110 is walking. In another example, a segment of the journey includes travel to San Diego, which based upon temperature data over time, a probability distribution for the temperature in San Diego can be constructed (e.g., there is a high probability that temperatures will be in the 60-80° F. range, and a very low probability that a temperature in San Diego will be 10° F.). The distribution data 410 or 420 can be indexed by (or computed in real time as a function of) time 411 or 421, location 412 or 422, other distribution data 413 or 423, etc. Continuing with the temperature example, the probability distribution of temperature values changes over the course of a day, time of year, etc. The distribution data may also depend upon location, for example if the user 110 is located on a freeway, it is more likely that the user 110 is driving rather than walking. Further, the probability distribution 410 or 420 can be indexed by other distribution data 413 or 423, if a light sensor indicates that it is very sunny, then the probability distribution data for a temperature determination may also be affected (e.g., daytime temperature versus nighttime temperature).

Figure 5:
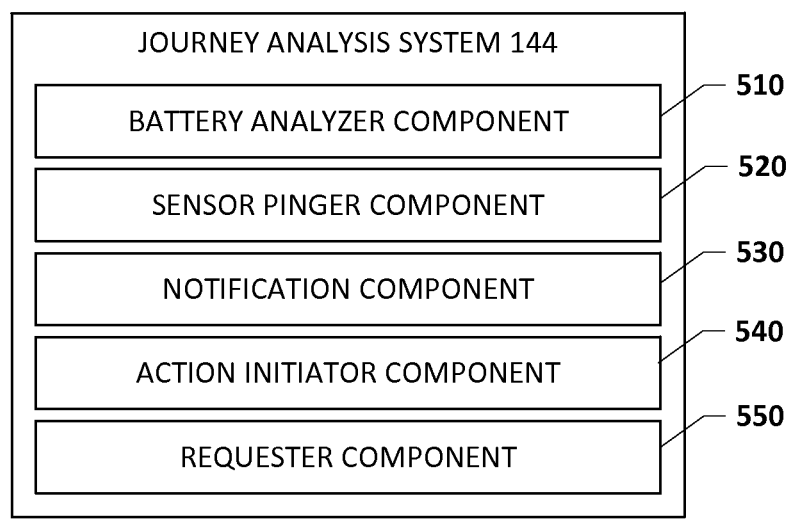
FIG. 5 is a block diagram illustrating an exemplary embodiment of a journey analysis system.

FIG. 5, system 500 illustrates the journey analysis system 144 and various components included therein. The journey analysis system 144 can be located at one or more devices and/or systems described herein. In an example, the journey analysis system 144 is included in the mobile device 130. In another example, the journey analysis system 144 can be included in a server computing device (or distributed across several computing devices) that may be in network communication with the mobile device 130. In still yet another example, the journey analysis system 144 can be a distributed system that is distributed between the mobile device 130 and at least one server computing device.

The journey analysis system 144 can comprise a plurality of components. A battery analyzer component 510 can be included in the journey analysis system 144, wherein the battery analyzer component 510 can be utilized to monitor battery charge of a battery at the mobile device 130. For example, the battery analyzer component 510 can be utilized to ensure that powering of one or more components located on the mobile device 130 does not result in the battery power being exhausted and the mobile device 130 is no longer functional for the journey.

A sensor pinger component 520 can be included in the journey analysis system 144, wherein the sensor pinger component 520 can be utilized to select operation of (e.g., data from) a particular sensor from a plurality of available sensors included in the mobile device 130. In an ideal situation, data is being collected from all of the available sensors, however, to conserve battery power, operation of a number sensors (e.g., data collection) can be temporarily halted with the mobile device 130 only having a selected (pinged) number of sensors operational, whereby the operational sensors (e.g., a sensor, a subset of sensors) can be selected upon the importance of data collected therefrom with regard to an ability to determine a location of the mobile device 130 (and the user 110). Hence, sensor usage can be based upon how much data from a particular sensor adds to a certainty, or an uncertainty, in the probability of determining a situational status of the user 110. Accordingly, a sensor that can reduce uncertainty can be prioritized for operation over a sensor that does not impart as much certainty in the probability determination, per the weighting techniques presented herein.

A notification component 530 is also included in the journey analysis system 144, wherein the notification component 530 is configured to generate a notification, a request, an action, etc., which can be transmitted to the user 110 undertaking the journey 120. The notification, etc., can include details about the journey, including a notification that the user has gone off track with respect to one or more journey segments, a notification of an expected event (e.g., a current event, a future event), a notification of a landmark that should be visible to the user 110, etc.

The journey analysis system 144 further includes an action initiator component 540, wherein the action initiator component 540 is configured to cause the mobile device 130 of the user 110 (or some other computing device) to perform an automated action based upon a computed probability regarding the journey 120. Exemplary actions include message transmittal, phone call initiation, automated ordering, a plane ticket being ordered, a concert ticket being ordered, a message being placed to a third party indicating that the user 110 is at a particular location and the third party can go meet them at the particular location, etc.

A requester component 550 is further included in the journey analysis system 144, wherein the requester component 550 can be configured to issue a request to the user 110 for an explicit observation(s), or information, regarding the surroundings of the user 110. The explicit observation can be utilized to reduce a degree of uncertainty as to the probability computation of the location of the user 110. Example requests to the user 110 can include "do you see building B?", "do you see a mountain range straight ahead", "are you walking on main street", "what vehicle are you operating?", etc. The request can include simple text, a voice message, a digital image, a map, etc.

As previously mentioned, a situation can occur where the mobile device 130 cannot be relied upon to provide situational awareness (e.g., line of sight between the mobile device and GPS satellites is occluded). Accordingly, the various embodiments enable the mobile device 130 to provide situation awareness while being GPS independent. Hence, by gathering data from a plurality of sensors, while GPS information may not be available, or it is not possible to rely on the GPS information entirely for situational awareness, the data from the plurality of non-GPS sensors can be combined to enable a location of the mobile device (e.g., mobile device 130) to be determined (e.g., journey 120, or portion thereof), and accordingly, a location of a user (e.g., user 110) of the mobile device.

Figure 6:
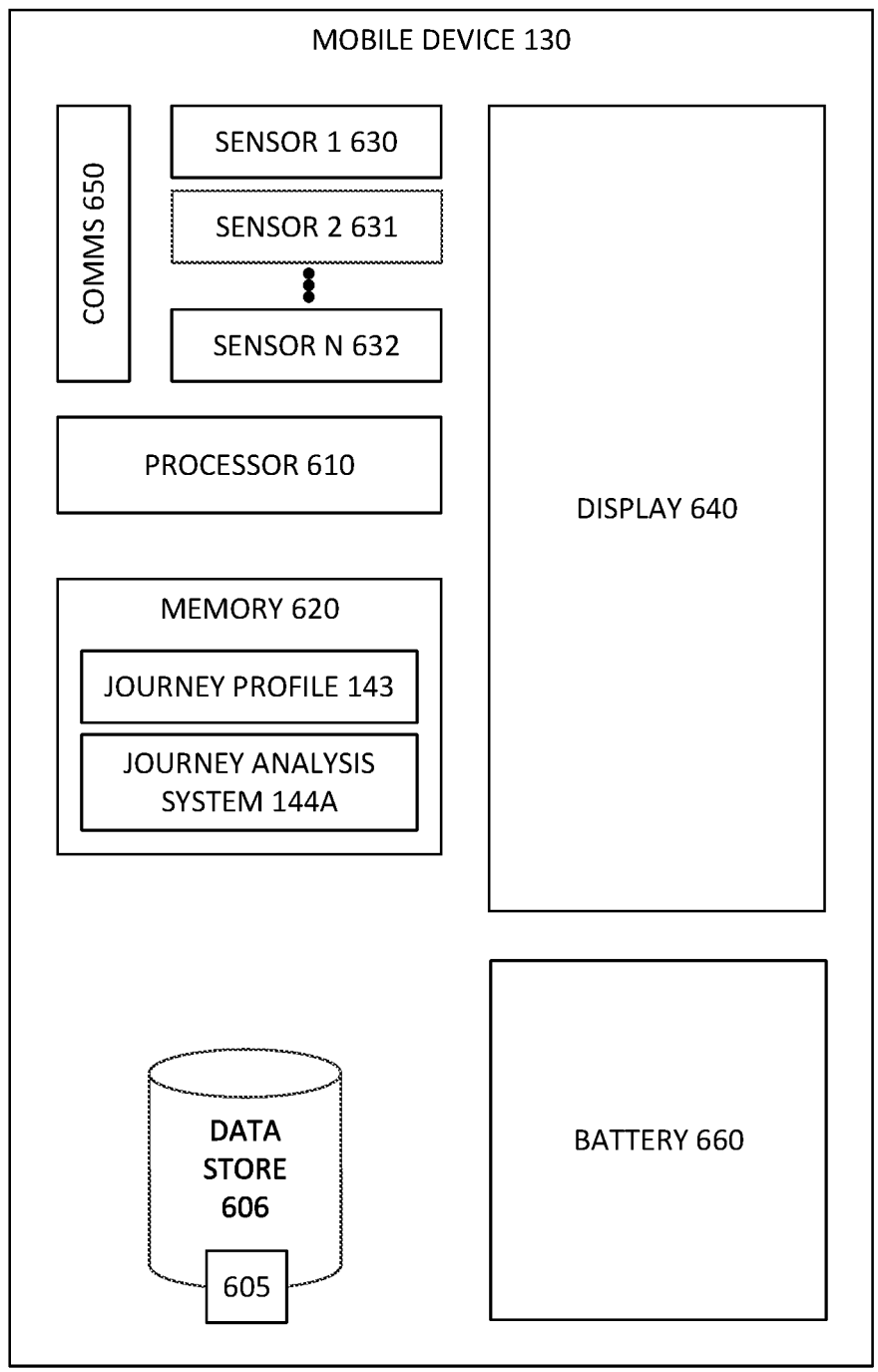
FIG. 6 is a block diagram illustrating an exemplary embodiment of a mobile device.

FIG. 6 illustrates an example of the various components comprising a mobile device 130. The mobile device 130 includes a processor 610 and a memory 620, wherein the memory 620 comprises data that is accessible to the processor 610 and instructions that can be executed by the processor 610. The memory 620 can include a journey profile component 143, which can be configured to perform one or more functions, as previously described. The memory 620 can include a journey analysis component 144A, which can be configured to perform one or more functions, as previously described with reference to the journey analysis system 144. As shown in FIGS. 1 and 6, a journey analysis system 144 can be located on the computing system 140 and a journey analysis system 144A can also be located on the mobile device 130, e.g., the journey analysis system is distributed between the computing system 140 (e.g., a server) and the mobile device 130 (e.g., a client). Distributing the journey analysis system (e.g., 144 and 144A) across the devices comprising system 100 enables the various embodiments presented herein to be flexible with regard to data generation, collection, and/or analysis during a journey 120 undertaken by the user 110. For example, for a period of the journey 120 the mobile device 130 may be unable to transmit data to the computing system 140, e.g., the user 110 is flying on a plane between respective points of a journey 120. During this period of non-communication, any data (e.g., data 605) generated by sensors located on the mobile device 130 can be stored on the mobile device 130 (e.g., in a data store 606 located on the mobile device 130) and processed by the journey analysis system 144A to enable a determination of the current location of the user 110 to be performed at the mobile device 130. In an embodiment, where it is known prior to the user 110 undertaking the journey that there will be a segment of the journey where there will be no network connection available between the mobile device 130 and the computing system 140, a plurality of location information can be downloaded to the mobile device 130, thereby enabling the mobile device 130 to maximize a level of confidence in a determined location of the user 110. In another embodiment, by having the journey analysis distributed across the system 100, the journey analysis system 144A can be configured to generate one or more requests for the user 110 locally at the mobile device 130, thereby increasing the efficiency of the distributed journey analysis system. For example, the journey analysis system 144A determines that a photograph of a current location of the user 110 could potentially improve a level of confidence in a determination of a location of the user 110, which can minimize a level of communication between the computing system 140 and the mobile device 130, which can further reduce a communication burden placed upon a power supply (e.g., a battery) of the mobile device 130, and furthermore, can increase the efficiency of operation of the journey analysis system 144 as a photograph that is determined to be required by the journey analysis system 144 will have already been taken and available from the journey analysis system 144A. Further, by distributing the journey analysis system, a calculation pertaining to a segment that is currently being navigated by the user 110 can be performed on the mobile device 130, while another calculation(s) for another segment is being performed on the computing system 140. In an embodiment, complexity of one or more algorithms executed by the journey analysis system 144A can be less than the complexity of corresponding algorithms executed by the journey analysis system 144, e.g., a first version of an algorithm operating in the mobile device 130 is a scaled back version of a second version of the algorithm operating on the computing system 140, wherein the first version algorithm may generate a first result that has less precision than a second result that is generated with the second version algorithm operating on the same sensor data that the first version algorithm is operating on. Accordingly, the first version of the algorithm may be computationally less complex than the second algorithm.

A plurality of 1–n sensors 630-632 are located on the mobile device 130, wherein the sensors 630-632 can be configured to provide a plurality of measurements regarding location, operation, etc., of the mobile device 130, and accordingly, the user 110, as described herein.

A display 640 can be included in the mobile device 130 to facilitate presentation of information to the user 110, wherein such information can include a route to be followed during the journey, a segment of a route to be followed, a text message, a digital photograph, a video, a map, an image, etc.

A communication system 650 (e.g., and an antenna) is included in the mobile device 130 to enable communication between the mobile device 130 and an external system, wherein the communication between the communication system 650 and the communication system 145 can be by any suitable technology, as previously mentioned.

Further, a battery 660 is included in the mobile device 130 to enable operation of the one or more components included in the mobile device, e.g., operation of the processor 610, memory 620, sensors 630-632, display 640, antenna 650, etc.

Figure 7:
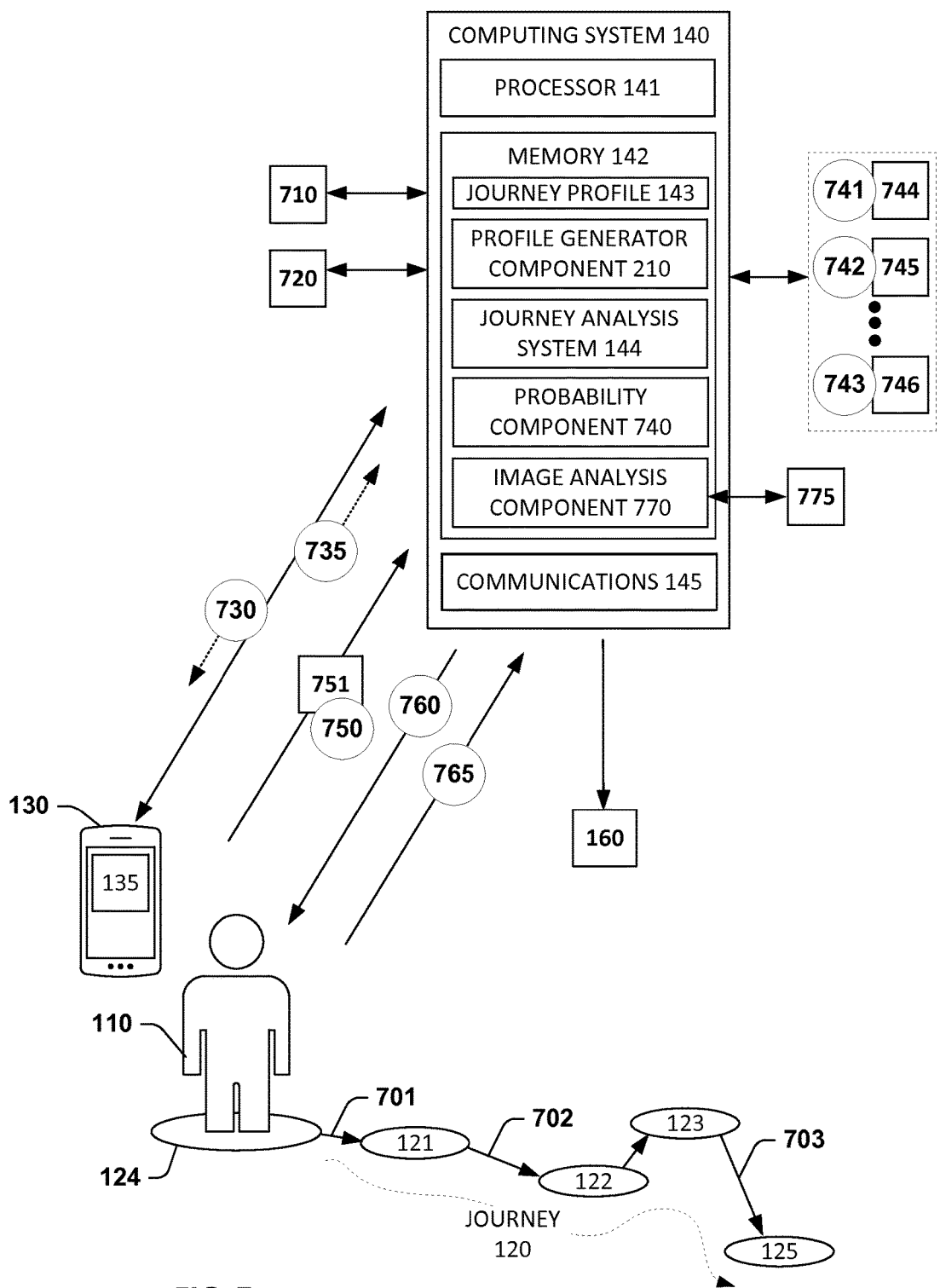
FIG. 7 is a block diagram illustrating an exemplary embodiment of operation of one or more components during a journey.

FIG. 7 is a block diagram illustrating various operations, data transmissions, etc., which can be performed and/or executed while a user 110 is navigating one or more segments of the journey 120. As shown in the example configuration depicted in FIG. 7, the user 110 is carrying the mobile device 130, wherein the mobile device 130 is in communication with a remotely located computing system 140. In an embodiment, the computing system 140 can be a server device, wherein the mobile device 130 is operating as a client device.

Initially, the journey profile component 143 is configured to generate a journey (e.g., journey 120), wherein the journey can include one or more waypoints (e.g., waypoints 121-123) in conjunction with a departure point (e.g., starting point 124) and a destination point (e.g., end point 125). In conjunction with generating a journey 120, the journey profile component 143 can establish and/or define one or more features (or parameters) 710 that pertain to any of the starting point 124, a waypoint 121-123, the end point 125, or a portion of the journey 120 being taken between the above mentioned points, e.g., a journey segment 701 between the departure point 124 and the first waypoint 121, a journey segment 702 between a first waypoint 121 and a second waypoint 122, a journey segment 703 between a waypoint 123 and the destination point 125. To facilitate determination of which features 710 are of interest during a situational awareness operation, the journey profile component 143 can execute a multi-dimensional feature extraction algorithm to extract features that can be useful for determining any of a location of a user, an activity of a user, etc.

The features 710 can be generated from any suitable source, e.g., a map, an online resource (e.g., the first web data source 220, the second web data source 230), from information provided by a third party (e.g., via the computer system 290), etc., wherein the features 710 can be stored in a data store (e.g., route data 281 in data store 280).

Further, as previously described, a profile generator component 210 can be utilized to generate profile information 720 about the user 110, wherein the profile information pertains to characteristics of the user 110. For example, as previously described, the user 110's voice profile, stride pattern, electrodermal characteristic, biometric data, etc. The profile data 720 can be stored in a data store (e.g., e.g., user data 271 in data store 270).

In an embodiment, the journey profile component 143 can generate and transmit a query 730 to the mobile device 130 (e.g., via communications systems 145 and 650), wherein the query 730 includes an instruction for the mobile device 130 to identify the one or more sensors (e.g., sensors 630-632) located on the mobile device 130. The mobile device 130 can generate a response 735, and transmit the response 735 to the computing system 140, wherein the response 735 can include a list of sensors available at the mobile device 130, wherein the list of sensors can include model number(s) of the sensor, and other pertinent information such as sensor sampling rate, sensor error, sensor range, power requirement(s) of the sensor, for when the sensor is in sleep mode, in operational mode, etc.

The list of sensors (e.g., sensors 630-632) in the response 735 can be utilized by the journey profile component 143 to determine which journey parameters 741-743 can be utilized as part of the situational determination of the mobile device 130, and further, based upon the operational characteristic(s) of each sensor in the list of available sensors 630-632, a determination can be made regarding a value of data received from a particular sensor in conducting a determination of the location of the mobile device 130, and the user 110.

As previously mentioned, in a GPS independent operation, data generated by the plurality of sensors 630-632 can be utilized (e.g., in isolation or in combination) to determine a location of the mobile device 130. A probability component 740 can be utilized to enable determination of the location of the mobile device 130, and correspondingly, whether the user 110 is adhering to the journey 120, and if so, their location on the journey 120, and if the user is not adhering to the journey, how to get back to a route defined by the journey 120, or a portion thereof. The probability component 740 can operate in combination with the journey analysis system 144.

In an embodiment, the probability component 740 can apply a respective weighting 744-746 to each respective parameter 741-743, wherein a weighting can be based upon a relative importance of the parameter and a level of confidence in a location determination engendered by the parameter. For example, a parameter that enables a high degree of confidence in a probability determination can be assigned a high weighting (e.g., analyzing a value of the parameter enables a determination to be made with a high level of confidence that the user 110 is at a particular location, is adhering to a journey, or not). In another example, a parameter that does not avail a high degree of confidence in a parameter determination to be made, e.g., the parameter plays a minor role in determining a location of a user 110, the low confidence parameter can be given a low weighting. Hence, in a situation where the battery analyzer component 510 determines that the battery 660 has a low power state, the weighting(s) assigned by the probability component 740 can be utilized to enable selection of which sensor(s), in the plurality of sensors 630-632, should be preferentially powered over those sensors which generate a parameter(s) that provide a low level of confidence of a user 110 being at a particular location. Further, a weighting can be determined for a parameter based upon information received in the list of sensors, a weighting can be based upon a characteristic of a sensor, e.g., the sample rate of the sensor, the accuracy of the sensor, a range of a sensor, etc.

As the user 110 undertakes the journey 120, the plurality of sensors on the mobile device can transmit data 750 comprising respective readings being generated by each sensor. The data 750 can be sent from the mobile device 130 to the computing system 140 as a data transmission 751 (e.g., data 150). In an embodiment, each sensor can transmit data in isolation, e.g., as data is received from each sensor 630-632 at the communication component 650, the data can be immediately transmitted, e.g., in real-time, to the communication component 145, whereupon the data can be processed at the computing system 140. In another embodiment, data from each sensor can be combined and sent as a single transmission, e.g., as data is received from each sensor 630-632 at the communication component 650, all of the data can stored for transmission in accordance with a transmission configuration of the communication component 650 (e.g., data to be transmitted based on a timed schedule, transmitted based upon a volume of data being combined at the communication component 650, etc.) can be sent in a single data packet, whereupon transmission of the data packet, subsequent data is pooled for a subsequent transmission in accordance with the transmission configuration of the communication component 650. Periodically packaging sensor data from multiple sensors 630-632 into a single data packet 751 can reduce data transmitted over a channel (e.g., between the communication component 650 and the communication component 145), and conserve battery life of the battery 660.

Upon receiving the data transmission 751, the probability component 740 can process the data 750, and based thereon, make a determination regarding a former, current, and or future location of the user 110, where such determination can be in response to any of "is the user 110 at a known location?", "is the user 110 adhering to the journey 120?", "If the user 110 is not adhering to the journey 120, is it possible and/or feasible to direct the user 110 back to a point on the journey 120?", "does the user 110 require assistance with regard to their location with respect to the journey 120, or a portion thereof?", "is further information required from the user 110 to improve a determination of their location?", "is an action to be performed based upon the user 110 being at a particular location?", etc.

As previously mentioned, while determining a location of the user 110, rather than a simple indication of the user 110 is at location X, or the user is not at location X, the probability component 740 can generate a degree of confidence in a determination of the user 110's current location. For example, based upon a first value(s) generated by a first sensor 630, the probability component 740 determines the user 110 is at a location Y with a confidence of 63% (e.g., a temperature value received from a temperature sensor located on the mobile device 130 is feasible for location Y, however, going by either an expected temperature(s) (e.g., a historic value as provided by the web data source 1) or a current temperature(s) (e.g., as provided by the web data source 2), the temperature value does not exactly match either the expected temperature or the current temperature, however it is within an expected temperature range for the location Y. Hence, to improve the degree of certainty of a current location of the user 110, a second value(s) generated by a second sensor 631 is utilized by the probability component 740 to supplement the first value, with a desire to increase the degree of confidence that the user 110 is either at location Y, or not, and in the event of not being at location Y, a subsequent determination is performed in an effort to determine the current location of the user 110 given that it has been determined that the user 110 is not at location Y.

The probability component 740 can utilize readings from as many sensors 630-632 as are available and powered. Further, as mentioned, the probability component 740 can request further information from the user 110 to supplement the location determination. For example, the probability component 740 can generate a request 760 for a photograph (e.g., a digital image) from the user 110's location, wherein the photograph can be requested to be taken in a particular direction. Upon receipt of the photograph 765, the probability component 740 can utilize an image analysis component 770 to review the photograph 765 and determine, based thereon, whether the user 110 is at a location identified by the probability component 740, or not. In an embodiment, one or more digital images 775 can be stored in the route data store 280, and retrieved during a determination of the user 110's location, e.g., by the image analysis component 770.

The probability component 740 can utilize any suitable probability or statistical technique(s) or method(s), e.g., classification and weighted data fusion, naïve Bayes, a Bayesian network(s), a decision tree(s), a neural network(s), a fuzzy logic model(s), a probabilistic classification model(s), a Support Vector Machine(s), a Gaussian Mixture Model(s), a logic regression, etc., to enable determination of a degree of confidence for a determination relating to the user 110 and the journey 120, e.g., a current location of the user 110.

As described with reference to FIG. 1, an output 160 can be generated, wherein the output 160 can include a notification of a location of user 110, a request for further information, an instruction to purchase an item, etc. The output 160 can be forwarded to the mobile device 110 or to a third party system (e.g., a third party system selling an item(s) or a service(s)).

Figure 8:
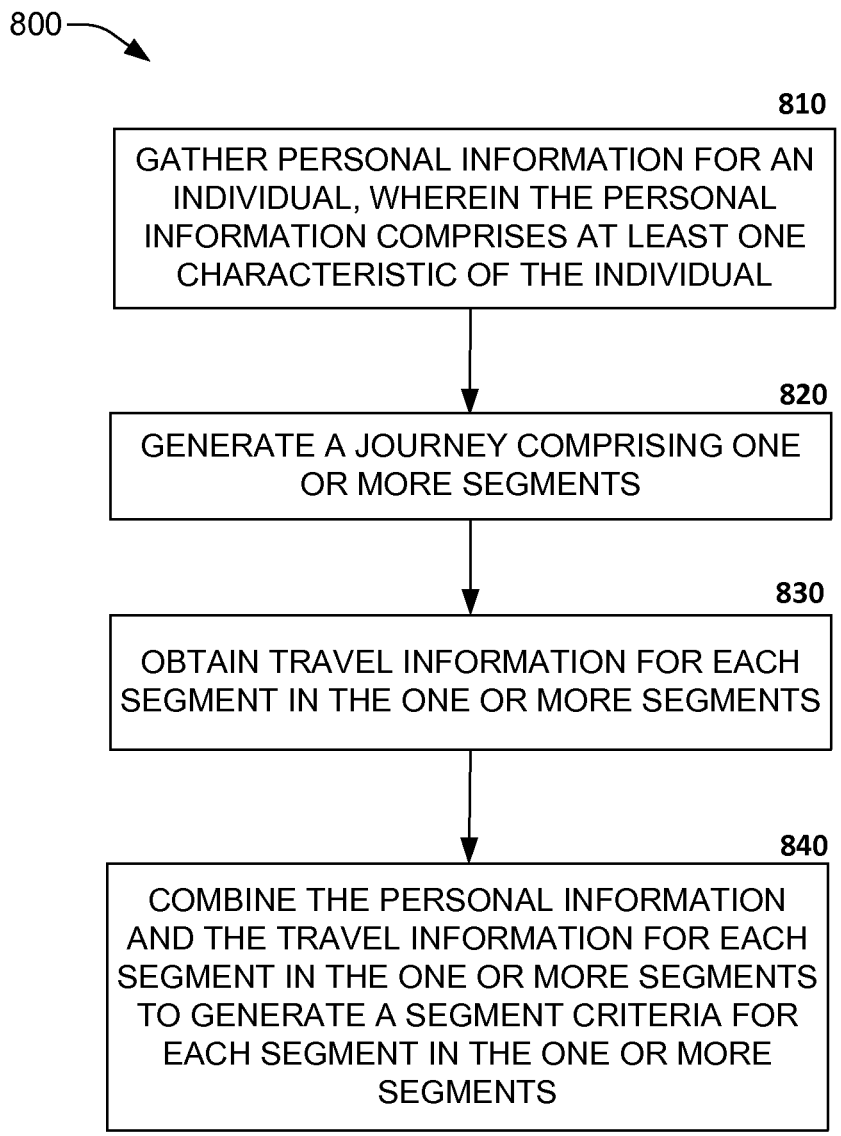
FIG. 8 is a flow diagram illustrating an exemplary methodology for generating a criteria for a segment of a journey based upon personal information relating to a user conducting the journey and travel information relating to the journey.
Figure 9:
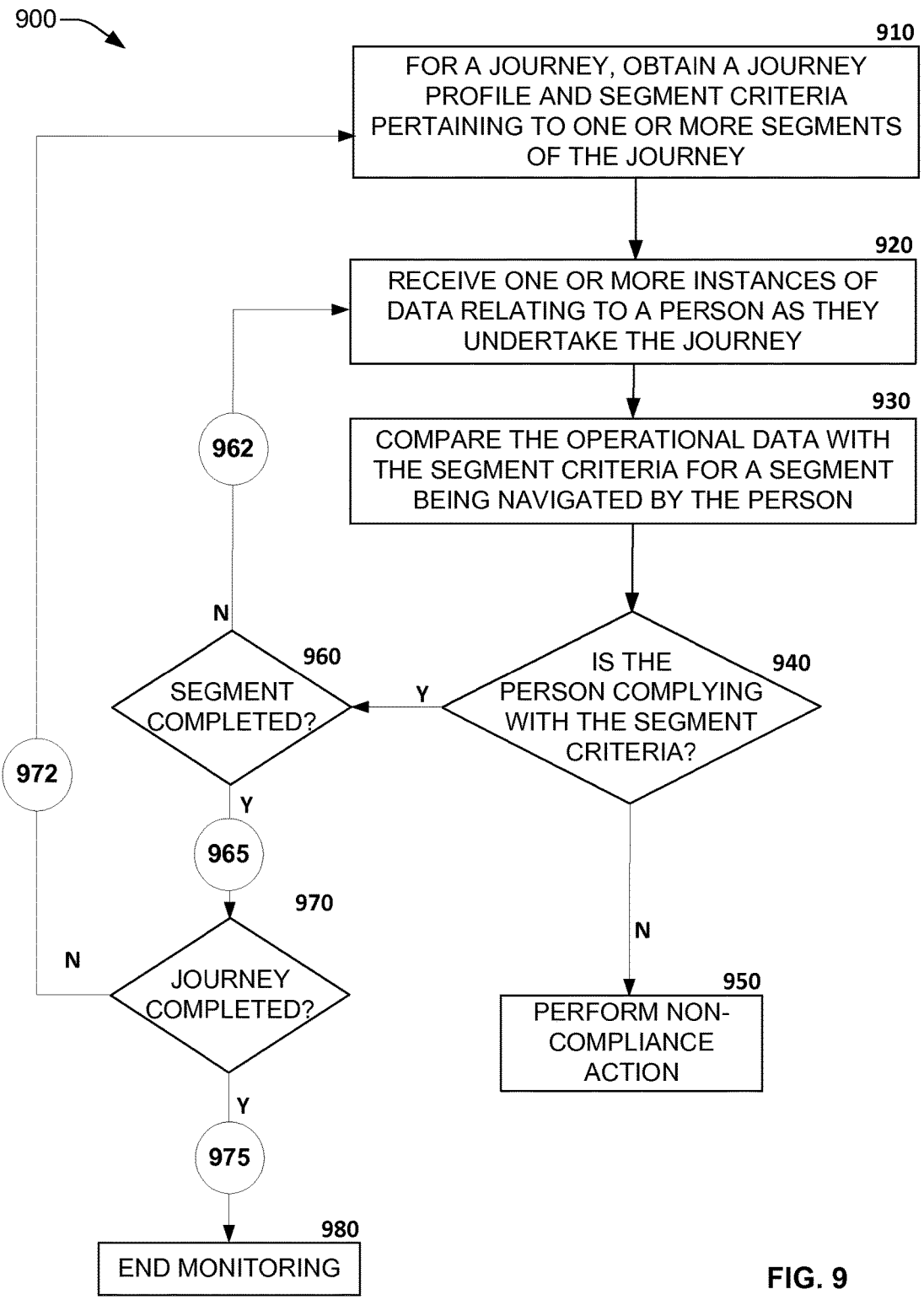
FIG. 9 is a flow diagram illustrating an exemplary methodology for determining compliance with a criteria of a journey or a segment of the journey.
Figure 10:
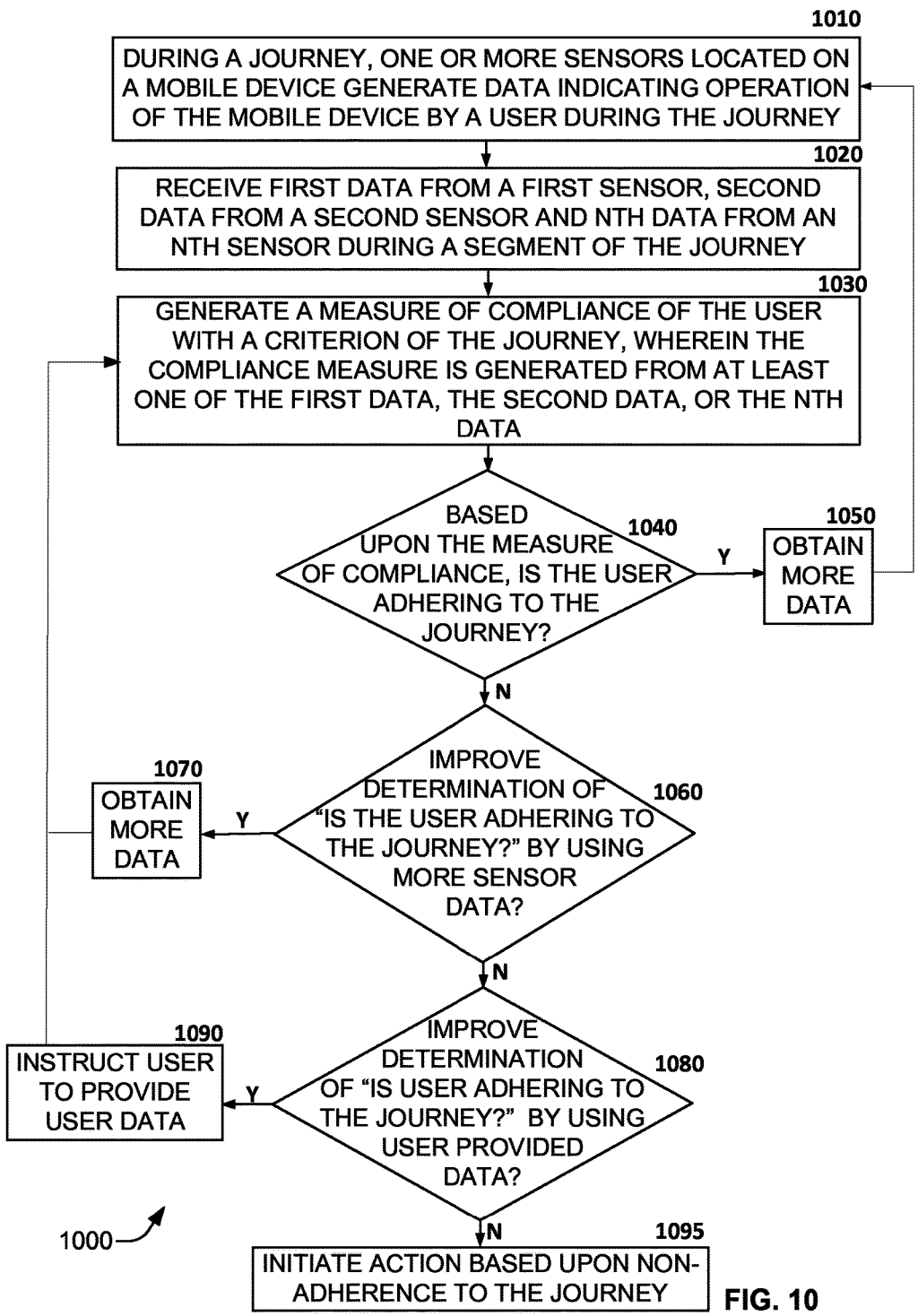
FIG. 10 is a flow diagram illustrating an exemplary methodology for determining a measure of compliance for a journey.

FIGS. 8-10 illustrate exemplary methodologies relating to determining a location of a mobile device, and accordingly an operator of the mobile device, when GPS may be unavailable/occluded. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 8 illustrates a methodology 800 for generating one or more criteria for a journey comprising a plurality of segments. At 810, a plurality of data (personal information) is obtained for a user (an individual), wherein the plurality of data pertains to at least one characteristic of the user. For example, generation of the data has occurred over a period of time such that the data can be utilized to identify the user, identify one or more activities of the user, etc., wherein the data can be utilized to train one or more probabilistic algorithms about one or more relationships between the data, e.g., when walking on a pavement the user has a typical stride length of about x inches, the user has a normal stride rate of about y strides per minute, however, when the user is walking at a brisk pace their typical stride length becomes about r inches, and the user has a brisk-pace stride length of s strides per minute. As described herein, a first characteristic of the user may have a higher degree of confidence in a likelihood that the user is performing a particular activity, as opposed to a second characteristic. Accordingly, each characteristic can be weighted to maximize a probability of a data analysis system correctly determining an activity of the user.

At 820, a journey is generated, wherein the journey is formed from a plurality of segments. For example, the journey can be separated into segments based upon different forms of transport being utilized throughout the journey. E.g., a first portion is walked (e.g., the user is setting off from an initial, departure point), a second portion is driven, a third portion is flown, a fourth portion is also driven, and a fifth, final portion is walked (e.g., the user is at their destination). Hence, in an embodiment, a journey can be segmented based upon different modes being utilized during the journey, e.g., the journey is multi-modal.

At 830, travel information for each of the segments can be obtained and/or generated. For example, if a journey comprises a plurality of destinations (or way points), weather information can be obtained (e.g., from historic data) for each of the destinations, thereby enabling a subsequent determination of whether the user is in one location or another. Other information can include historic data for travel of a segment (e.g., between two points) such as average travel time and a range in travel time for a plurality of travel modes, routes, etc. For example, flight duration under normal circumstances, flight duration as a function of head wind, tailwind, delay time information for a particular flight, speed information (e.g., average speed) for a journey by automobile, route information such as journey time versus time of day (e.g., midday, morning rush hour, evening rush hour, etc.), diversions, etc.

At 840, the user data and the journey data can be combined for the journey, and segments included therein to generate a criteria for each segment. For example, while an average time obtained from a database (e.g., an online mapping service) to complete a segment of the journey, e.g., via a highway, may take x minutes±y minutes (e.g., at an average speed of r mph), from the user data it is determined that the user (e.g., a first user) drives faster than the average speed of r mph. For a second user, and user data generated for them, it is determined that the second user drives slower than the average speed of r mph, and hence, based upon the user data for the second user, their criteria for the segment is adjusted to be an average speed of p mph. Hence, it is possible to generate and assign a criteria (e.g., a segment completion time) to a user (e.g., the first user or the second user) for a segment, without the user having previously travelled the segment. The segment criteria can be based in part upon information already known about the user (e.g., after a period of observation).

FIG. 9 illustrates a methodology 900 for determining a location and/or an activity of a person undertaking a journey. FIG. 9 can be considered a continuation of the flow depicted in FIG. 8. Accordingly, at 910, a journey is defined for the user to follow and criteria are defined for each respective segment in the journey. For example, as previously described, a criteria for a segment can be defined (e.g., personalized) for the user.

At 920, the user can undertake the journey, wherein to enable monitoring of the user, e.g., to facilitate determination of a location of the user while they undertake the journey, the user can carry with them, and, as necessary, interact with, a mobile device (e.g., a smart phone), wherein the mobile device includes a plurality of sensors. In an embodiment, one of the sensors in the plurality of sensors can be a GPS sensor which can provide location information regarding a location of the mobile device and accordingly, the user. However, as previously mentioned, signaling from the GPS sensor may be attenuated to the point that GPS can be considered to be unavailable. Accordingly, data from other sensors located on the mobile device can be combined to enable location determination of the user when the GPS is unavailable.

At 930, operational data can be compared to a segment criteria(s). For example, a motion sensor (e.g., a pedometer) can be included in the mobile device and as the user walks along a pavement, their pace, stride length, etc., can be recorded by the mobile device. The walking data can be transmitted to an external system (e.g., a computer, a server-based computer, etc.) whereupon the walking data can be analyzed to determine a location of the user. In a first example usage, by comparing the walking data received from the mobile device with walking data previously recorded for the user (e.g., historical (a priori data) and/or training data) a determination can be made regarding whether the mobile device is being operated (e.g., carried) by the expected user or whether the walking data received from the mobile device bears minimal resemblance to the previously recorded walking data, and rather, the mobile device may be being operated by a different user (e.g., a second user) to the expected user (e.g., a first user). In an embodiment, if the mobile device is being shared amongst a team of individuals (e.g., a platoon of soldiers), and a first individual (e.g., a first soldier) is no longer operating the mobile device, it is possible to re-evaluate the walking data received from the mobile device with regard to other walking data previously recorded for the other soldiers in the platoon to identify which soldier is now bearing the mobile device. In response to determining that a different soldier (e.g., a second soldier), having a known identity is now operating the mobile device, the previously defined segment criteria can be re-generated in accordance with personal data previously recorded (e.g., training data) for the second soldier. For example, if stride length and pace are being utilized to determine the location of the mobile device, the segment criteria can be computed in accordance with the known stride length and pace of the second soldier.

At 940, a comparison can be made between data received from the mobile device and data defined in the segment criteria.

At 950, in response to determining that the mobile device is being operated in a non-compliant manner with regard to the segment criteria, a non-compliance action can be initiated. For example, if the mobile device is being carried by a person determined to be a person different to the person expected to be carrying the mobile device, in a first embodiment, a request can be presented on the mobile device (e.g., on a screen) requesting the operator of the mobile device identify themselves, and based upon such identification, a new segment criteria can be generated for the user to comply with as a function of their own personal characteristic(s). In another embodiment, a request can be presented on the mobile device requesting the user provide further information to enable improved identification of the user location, e.g., a digital image of the users view, a video capture of the users view, record and transmit a description of the users view, etc. In another embodiment, where the location of the mobile device is known but is determined to not be adhering to the journey, an instruction can be forwarded to the user (e.g., via the mobile device) providing details of how the user can get back onto a route (e.g., a segment of the journey).

Returning to 940, in response to a determination that the user is complying with the segment (e.g., is on the correct route, is travelling by a preferred mode of transport, etc.) the flow can advance to 960. At 960 a determination can be made to identify whether the current segment in the journey has been completed? In response to a determination that no, the segment is still to be completed, further data can be collected and/or generated by the sensors included in the mobile device, per 920.

Further, at 960, in response to determining the segment has been completed, the flow can advance to 970, whereupon a determination of whether the journey has been completed can be performed. In response to determining that the journey has been completed, monitoring of the user can be terminated at 980.

Returning to 970, in response to determining that the journey has not been completed, even though the current journey segment has been, the flow can return to 910 whereupon a criteria for a next segment in the journey can be obtained and the flow continues to 920 wherein sensor data is received while the mobile device is being conveyed and/or operated in the next segment of the journey.

FIG. 9 also includes acts 962, 965, 972, and 975 which correspond to an action being performed. As previously described, an action can be instigated autonomously in accordance with one or more initiating conditions. In an embodiment, an initiating condition can be a computed probability regarding the journey, and exemplary actions can include message transmittal, phone call initiation, automated ordering, a ticket being ordered, a meal being ordered, an indication of a current location of the user being generated (e.g., for presentation of the display 640, at the computing system 290, etc.), a message being placed to a third party indicating that the user is at a particular location, a message being placed to a third party indicating that the user is not at a particular location, in the event of a determination (e.g., having a high probability of likelihood) that the user is not adhering to the route (e.g., acts 962 and 972) the user can be provided with instructions (e.g., displayed on the mobile device, presented as a voice file on the mobile device) on how to navigate back to the journey route.

FIG. 10 illustrates a methodology 1000 relating to determining whether a user is adhering to one or more requirements of a journey. At 1010, the user is undertaking the journey and is carrying with them a mobile device. As previously described, the mobile device has one or more sensors located thereon, wherein the one or more sensors can generate a variety of data which can be utilized to make a determination about the user, an activity of the user, a location of the user, a compliance of the user to a requirement relating to the journey, etc.

At 1020, the mobile device can be communicatively coupled to a remotely located computing system, e.g., a server. A data analysis program can execute on the remotely located computing system. Data generated by the various sensors located on the mobile device can be transmitted from the mobile device to the remotely located computer system, wherein the data analysis program is configured to process the sensor data.

At 1030, a measure of compliance of the received sensor data can be generated at the remotely located computing system. In an embodiment, the user is required to follow a particular route for the journey, and, as previously described a measure of compliance with a criterion (requirement) of the journey can be determined. The measure of compliance can be generated from any of the sensor data. As previously described, data from a particular sensor (e.g., data from a first sensor) may be of more value in generating a measure of compliance (e.g., provides high likelihood and/or probability of the measure of compliance being correct). To enable the first sensor data to be given priority over data of lesser value (e.g., data from a tenth sensor), the first data can be weighted to indicate its importance. Similarly, data from other sensors can also be weighted in accordance with a value of the particular sensor data in generating a measure of compliance, and the probability of the measure of compliance being correct.

At 1040, based upon the measure of compliance (e.g., as determined from the one or more sensors utilized at 1030) a determination can be made regarding whether the user is adhering to the journey criterion. Example criteria include being at a certain location, following a particular route, utilizing a mode of transport, etc. At 1050, in the event of determining that YES the user is adhering to the criterion, the user is able to continue their progress along the journey, complete the journey, etc., wherein further data can be obtained (e.g., sensor data) as the user continues along the journey. With continuation of the journey by the user, the flow can return to 1010.

At 1040, in response to a determination of NO the user is not adhering to the criterion, at 1060, a determination can be made as to whether a probability of the current measure of compliance can be improved by analyzing data from another sensor. The data analysis program operating at the remotely located computing system can be configured to identify a particular type of sensor data that may improve the current measure of compliance. In response to YES there is a possibility of improving the measure of compliance with further sensor data, at 1070 further data can be obtained from the mobile device. In an embodiment, an instruction can be forwarded from the remotely located computing system to the mobile device, instructing the mobile device to monitor and/or forward the desired sensor data to the remotely located computing system. In an embodiment, the desired sensor data may be sourced from a sensor at the mobile device that is currently inactive (e.g., is in a sleep mode to conserve battery life at the mobile device), whereupon receipt of the instruction from the remotely located computing system, the sensor is activated and data is collected therefrom.

At 1060, in response to NO, improving the measure of compliance with further sensor data is not possible, at 1080 a determination can be made as to whether the measure of compliance can be further improved based upon receiving data provided by the user. In response to a determination that YES user provided data may improve the measure of compliance, at 1090 an instruction can be forwarded from the remotely located computing system to the mobile device, instructing the user to provide further data (e.g., capture a digital image of the users current location, provide a voice file describing the users current location, mode of transport, etc.). The user provided data can be forwarded to the remotely located computing system, wherein the user provided data can be incorporated into the generation of the measure of compliance (e.g., the user provided data becomes the nth data). As previously described, the data analysis system can utilize training data and compare it with received data to determine the measure of compliance. In an embodiment, the user provided data can be utilized to refine the training data to improve the accuracy of a further measure of compliance.

At 1080, in response to a determination that NO, any user provided data will not improve the measure of compliance, at 1095 an action can be initiated based upon the non-adherence to the journey, where such action can include terminate the journey, relocate to a new destination, etc.

It is to be appreciated that while the various embodiments presented herein are illustrated as being directed towards a person (a user, an individual) is carrying the mobile device throughout a journey, or segment thereof, the various embodiments are also directed towards the mobile device accompanying an object which is in transit, the location of which is being monitored throughout the journey, or segment thereof. Further, the mobile device itself can be the object in transit, the location of which is being monitored throughout the journey, or segment thereof. Further, the person, or other living entity can be considered to be the object being tracked, per the various embodiments presented herein.

Hence, a journey can be defined, and various criteria and/or parameters assigned thereto to enable generation of an expected journey profile in accordance with a requirement(s) for conveyance of the object. For example, the object could be an item that requires temperature control (e.g., is in a refrigerated box), and a criteria can be defined regarding the object should be maintained at a temperature of $X° F.±Y° F.$ throughout the journey. In another example, a criteria can be generated requiring that the object reaches a certain location within a particular amount of time. Thus, the expected journey profile can be generated in view of such criteria, and further, in view of the various journey conditions (e.g., flight, temperature, waypoint location, destination, expected time for travel, etc.). During transit of the object, the mobile device can generate various measurements (as previously described), and based thereon, an actual journey of the object can be compared with the expected journey. For example, based upon differences between the actual journey and the expected journey, a determination can be made regarding whether the object (e.g., a human organ) is still in a condition acceptable for use.

Figure 11:
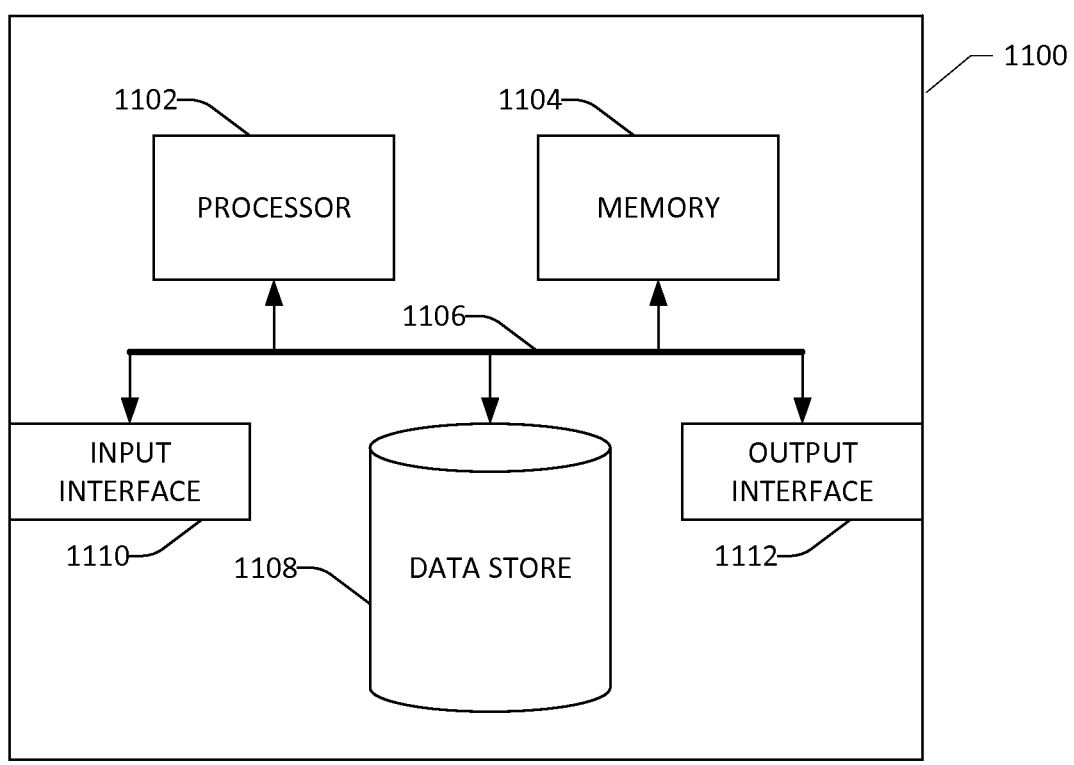
FIG. 11 illustrates an exemplary computing device.

Referring now to FIG. 11, a high-level illustration of an exemplary computing device 1100 that can be used in accordance with the systems and methodologies disclosed herein is illustrated. For instance, the computing device 1100 may be used in a system to determine compliance of a user with a requirement of a journey or journey segment, e.g., the computing device 1100 functions as any of the mobile device 130, the computing system 140, etc. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store operating parameters, required operating parameters, and so forth.

The computing device 1100 additionally includes a data store 1108 that is accessible by the processor 1102 by way of the system bus 1106. The data store 1108 may include executable instructions, operating parameters, required operating parameters, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc., by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A mobile computing device comprising:
   a processor;
   a first sensor that is operatively coupled to the processor, the first sensor is configured to output a first sensor signal that is indicative of a first parameter;
   a second sensor that is operatively coupled to the processor, the second sensor is configured to output a second sensor signal that is indicative of a second parameter, wherein neither the first parameter nor the second parameter are location of the mobile computing device, and further wherein a global positioning system (GPS) signal is unavailable at the location of the mobile computing device;
   memory that is operatively coupled to the processor; and
   a battery that powers the processor, the plurality of sensors, and the memory,
   wherein the memory stores instructions that, when executed by the processor, cause the processor to perform acts comprising:
      estimating, based upon the first sensor signal and the second sensor signal, a location of a user of the mobile computing device in a predefined travel segment of a predefined journey that includes multiple travel segments, wherein different travel modalities are used when travelling over the multiple travel segments of the predefined journey, wherein a travel modality of the predefined travel segment is air travel, wherein the first sensor signal is assigned a first weight and the second sensor signal is assigned a second weight, the first weight is indicative of influence of the first sensor signal when estimating the location of the user of the mobile computing device in the predefined travel segment, the second weight is indicative of influence of the second sensor signal when estimating the location of the user of the mobile computing device in the predefined travel segment, the second weight is less than the first weight;
      detecting that the battery has a low power state;
      responsive to detecting that the battery has the low power state, powering off the second sensor while continuing to provide power to the first sensor, the second sensor powered off based upon the second weight assigned to the second sensor signal being less than the first weight assigned to the first sensor signal;

subsequent to powering off the second sensor, estimating, based upon the first sensor signal, the location of the user of the mobile computing device in the predefined travel segment of the predefined journey; and performing a computing operation based upon the estimated location of the user of the mobile computing device in the predefined travel segment.

2. The mobile computing device of claim 1 being a mobile telephone.

3. The mobile computing device of claim 1, wherein another travel modality in the different travel modalities is walking.

4. The mobile computing device of claim 1, wherein another travel modality in the different travel modalities is driving.

5. A method performed by a mobile computing device, the method comprising:

estimating, based upon a first sensor signal generated by a first sensor and a second sensor signal generated by a second sensor, a location of a user of the mobile computing device in a predefined travel segment of a predefined journey that includes multiple travel segments, wherein different travel modalities are used when travelling over the multiple travel segments of the predefined journey, wherein a travel modality of the predefined travel segment is air travel, wherein the first sensor signal is assigned a first weight and the second sensor signal is assigned a second weight, the first weight is indicative of influence of the first sensor signal when estimating the location of the user of the mobile computing device in the predefined travel segment, the second weight is indicative of influence of the second sensor signal when estimating the location of the user of the mobile computing device in the predefined travel segment, the second weight is less than the first weight, and further wherein neither the first sensor nor the second sensor is a location sensor and a global positioning system (GPS) signal is unavailable at the location of the mobile computing device;

detecting that a battery that powers the first sensor and the second sensor has a low power state;

responsive to detecting that the battery has the low power state, powering off the second sensor while continuing to provide power to the first sensor, the second sensor powered off based upon the second weight assigned to the second sensor signal being less than the first weight assigned to the first sensor signal;

subsequent to powering off the second sensor, estimating, based upon the first sensor signal, the location of the user of the mobile computing device in the predefined travel segment of the predefined journey; and performing a computing operation based upon the estimated location of the user of the mobile computing device in the predefined travel segment.

6. The method of claim 5, wherein a second predefined travel segment is immediately after the predefined travel segment in the predefined journey, wherein the user travels over the second predefined travel segment using a travel modality that is different from air travel.

7. The method of claim 5, wherein the mobile computing device is a mobile telephone.

8. A mobile computing device that comprises a computer-readable storage medium, the computer-readable storage medium comprises instructions that, when executed by a processor, cause the processor to perform acts comprising:

estimating, based upon a first sensor signal generated by a first sensor and a second sensor signal generated by a second sensor, a location of a user of the mobile computing device in a predefined travel segment of a predefined journey that includes multiple travel segments, wherein different travel modalities are used when travelling over the multiple travel segments of the predefined journey, wherein a travel modality of the predefined travel segment is air travel, wherein the first sensor signal is assigned a first weight and the second sensor signal is assigned a second weight, the first weight is indicative of influence of the first sensor signal when estimating the location of the user of the mobile computing device in the predefined travel segment, the second weight is indicative of influence of the second sensor signal when estimating the location of the user of the mobile computing device in the predefined travel segment, the second weight is less than the first weight, and further wherein neither the first sensor nor the second sensor is a location sensor and a global positioning system (GPS) signal is unavailable at the location of the mobile computing device;

detecting that a battery that powers the first sensor and the second sensor has a low power state;

responsive to detecting that the battery has the low power state, powering off the second sensor while continuing to provide power to the first sensor, the second sensor powered off based upon the second weight assigned to the second sensor signal being less than the first weight assigned to the first sensor signal;

subsequent to powering off the second sensor, estimating, based upon the first sensor signal, the location of the user of the mobile computing device in the predefined travel segment of the predefined journey; and performing a computing operation based upon the estimated location of the user of the mobile computing device in the predefined travel segment.

9. The mobile computing device of claim 8 being a mobile telephone.

10. The mobile computing device of claim 8, wherein the computing operation is outputting data to the user of the mobile computing device to inform the user that the user is complying with the predefined journey.

* * * * *